Aug. 7, 1945.　　　J. W. TETER　　　2,381,470
PRODUCTION OF ORGANIC COMPOUNDS CONTAINING NITROGEN
Filed Nov. 13, 1940
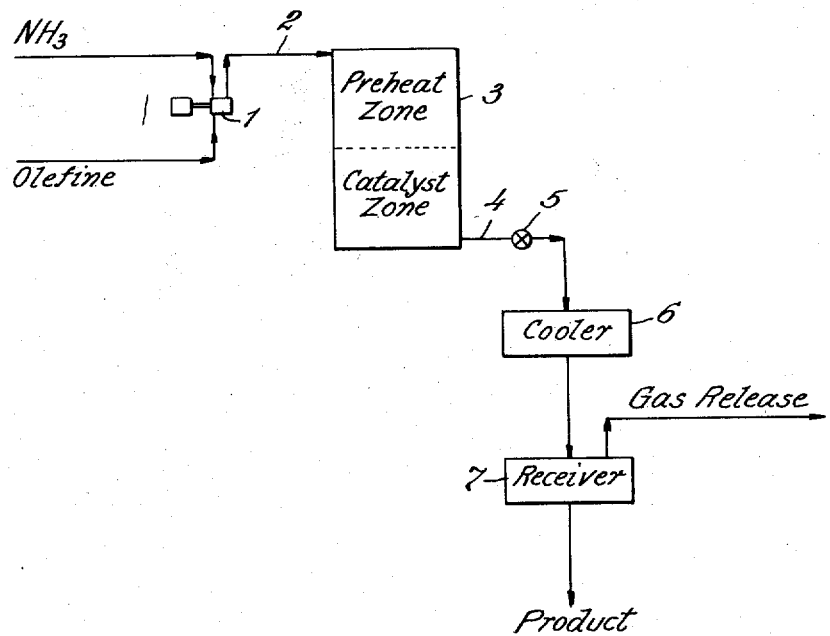
INVENTOR
John W. Teter
BY
ATTORNEYS Patented Aug. 7, 1945

2,381,470

UNITED STATES PATENT OFFICE 2,381,470

PRODUCTION OF ORGANIC COMPOUNDS CONTAINING NITROGEN

John W. Teter, Chicago, Ill., assignor to Sinclair Refining Company, New York, N. Y., a corporation of Maine Application November 13, 1940, Serial No. 365,561

12 Claims. (Cl. 260—464)

This invention relates to the production of amines, nitriles and their derivatives from unsaturated hydrocarbons such as those available in gas mixtures produced in the processing of hydrocarbon oils, as in the refining of petroleum, by direct catalytic reaction with ammonia.

Organic nitrogen compounds such as the amines, nitriles and their derivatives have a variety of present uses in industry and have potentialities of wider use both as addition agents in lubricants and fuels and as raw materials for the production of other chemicals. Amines and their derivatives are useful as anti-knock agents and color stabilizers in motor fuels and as anti-corrosion, anti-sludging, anti-lacquering and color stabilizing agents in lubricants. Nitriles are useful oiliness agents in lubricants and are easily converted to amines. Diamines and dinitriles are particularly important as a source of raw materials for the production of superpolyamides such as nylon. The cost of producing these organic nitrogen compounds by present commercial methods is considerable and restricts their use.

Generically, the reaction of direct amination in accordance with this invention is one in which one N—H bond of ammonia is activated and in which the double bond of an olefine is in the active state. The reaction proceeds when the reactants, thus activated, are in intimate contact. The mechanics of the reaction may be explained as the attachment of one atom of hydrogen from the activated N—H group of the ammonia to one of the double bonded carbon atoms in the olefine and as the attachment of the NH₂ radical of the ammonia to the other double bonded carbon atom of the olefine. This reaction, whereby the primary amine is formed, may be represented as follows:

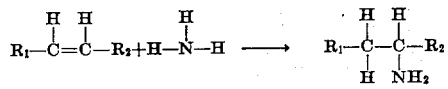

The secondary amine is formed by substitution for one of the hydrogen atoms of the amino radical in the primary amine, involving activation of another N—H bond. Activation of still another N—H bond leads to the formation of the tertiary amine. Dehydrogenation of the amine results in the formation of the corresponding nitrile.

I have discovered that organic nitrogen compounds such as amines and nitriles may be produced by passing a mixture of an olefine and ammonia through a bed of catalyst selectively promoting the amination reaction at a temperature from about 450° F. to about 750° F. and under a pressure of about 500 pounds per square inch and upward. The amines and nitriles, or "organic nitrogen compounds" as they will be referred to collectively herein, are formed to a substantial extent under the foregoing reaction conditions, but competing reactions of cracking, polymerization, dehydrogenation and hydrogenation take places simultaneously with the amination reaction to an extent which varies considerably with reaction conditions such as temperature and pressure.

Cracking, which appears to be confined principally to the amine produced by the amination reaction, increases with increasing temperature and becomes rapidly greater at temperatures substantially in excess of about 600° F. Cracking also increases with increasing pressures above about 3000 pounds per square inch. Polymerization of the olefine charged to the amination reaction is promoted by the use of high temperatures and increases with increasing time of contact between the reactants and catalyst, thus appreciably depleting the olefine charge at temperatures upwards of about 600° F. Dehydrogenation of the amine formed as the primary product of the amination reaction converts the amine to the corresponding nitrile, a conversion which is not unduly serious in itself but which liberates hydrogen with resulting hydrogenation of the olefine charge to form the corresponding paraffin hydrocarbon. Dehydrogenation is favored by the use of high temperature and appears to attain a maximum at pressures of about 1000 pounds per square inch. However, dehydrogenation appears to decrease to a substantial extent with increasing pressure upwards of about 1000 pounds per square inch. Decreasing dehydrogenation lowers the production of liberated hydrogen and thereby lowers the extent of olefine hydrogenation at pressures upwards of about 1000 pounds per square inch.

I have found that nitrogen fixation, that is, the production of organic nitrogen compounds by the amination reaction, in accordance with my invention takes place to an important extent at temperatures from about 450° F. to about 750° F., the extent of nitrogen fixation being greater intermediate the extremes of this temperature range than at either extreme of the temperature range. Thus, temperatures from about 500° F. to about 600° F. are highly advantageous and temperatures of about 550°–575° F. are particularly advantageous. Within the foreging temperature range the optimum pressure for nitrogen fixation based on olefine charged to the reaction is about 1000 pounds per square inch, but cracking, dehydrogenation and hydrogenation compete with nitrogen fixation to an important extent at this pressure. I have found that the extent of nitrogen fixation, based on olefine consumed, increases at pressures upward of about 1000 pounds per square inch and attains its maximum at about 2000 pounds per square inch. Pressures between about 1000 and 3000 pounds per square inch may be used with advantage and within this range pressures of about 2000 pounds per square inch and upward are particularly advantageous.

The unsaturated hydrocarbons which may be aminated to form organic nitrogen compounds in accordance with my invention may be obtained from any available source. Thus, olefines obtained by dehydrogenation of substantially pure aliphatic organic compounds, such for example as paraffinic hydrocarbons, or dehydration of aliphatic alcohols, or olefines available in gas mixtures produced in the processing of hydrocarbon oils, as in the refining of petroleum, may be used with advantage. For example, olefines obtained from cracking of hydrocarbons, such as petroleum, and olefines such as polymer gasoline and other olefine polymers may be aminated in accordance with my invention. I have found, however, that olefines having a double bond at the end of the carbon chain are the most active and are most readily aminated under my reaction conditions. Olefines obtained from the cracking of hydrocarbons, such as petroleum, are characterized by a double bond at the end of their carbon chains and for this reason comprise a particularly advantageous olefinic charging material for the production of organic nitrogen compounds in accordance with my invention.

I have found that the amount of ammonia used with advantage in accordance with my invention should exceed that amount required theoretically to combine with the olefine charged to the amination reaction. Thus, a molar ratio of about 1.6, and higher, mols of ammonia to 1.0 mol of olefine is particularly effective. Ammonia-olefine molar ratios as high as about 3.5/1.0 have been found to be very effective with respect to nitrogen fixation although this larger proportion of ammonia, and particularly ratios substantially higher than 3.5/1.0, appear to increase the amount of cracking taking place during the amination reaction.

Numerous metallic catalysts selectively promote the amination reaction under my reaction conditions. However, cobalt and nickel appear to be the most satisfactory metallic catalysts and of these two catalysts cobalt is superior to nickel. The metallic catalyst is preferably deposited on a suitable support which will form a porous bed with a relatively large contact surface. Metallic cobalt on silica and metallic cobalt on a cobalt silicate support have been found to be effective catalysts for use in accordance with my invention. Although initially similar in activity, the cobalt-on-cobalt silicate catalyst being somewhat less active than the cobalt-on-silica catalyst, these two catalysts differ principally in that the cobalt-on-cobalt silicate catalyst maintains its nitrogen fixation activity for a longer period in use and produces less polymer products than does the cobalt-on-silica catalyst under similar reaction conditions. A catalyst comprising metallic cobalt on a diatomaceous silica has also been found to be capable of selectively promoting the amination reaction.

The following specific operation directed to the catalytic amination of dodecene will illustrate the process of the invention, although it must be understood that my process is not limited to this specific operation. Dodecene-1 was prepared by dehydration of n-lauryl alcohol over granular alumina, the lauryl alcohol being obtained in the form marketed by du Pont under the trade name of "Palmal No. 23." The olefine was separated from unconverted alcohol by fractionation. The dodecene-1 thus obtained had a boiling point of 421°–425° F., a specific gravity of 0.7634, a refractive index of 1.4330, a bromine addition number of 85.5 and a bromine substitution number of 2.5. The dodecene-1 thus prepared was then used as the olefine charged to the amination process in this example.

Dodecene-1 and liquid ammonia were delivered to a pump 1, as shown in the accompanying schematic drawing, and the combined charge was forced by means of the pump through line 2 into the preheating zone of the reaction chamber 3. The preheating zone of the reaction chamber comprised the upper portion of the reaction chamber which was electrically heated and was filled with stainless steel Raschig rings. The lower portion of the reaction chamber comprised the catalyst zone and was filled with pellets of a catalyst comprising metallic cobalt deposited on silica. This catalyst was obtained by precipitating cobalt hydroxide on silica gel suspended in a solution of cobalt acetate and by reducing the washed and dried precipitate in pellet form in a stream of hydrogen for a period of 100 hours at a temperature of 660° F., the pelleted catalyst being dried at an elevated temperature in a nitrogen atmosphere prior to reduction. Hydrogen was purged from the system with ammonia. Drying and reduction of the catalyst was effected in the catalyst zone prior to amination in order to avoid oxidation of the cobalt catalyst by the presence of adventitious air. The volume of catalyst pellets charged to the catalyst zone prior to drying and reduction of the catalyst was 1000 cc. and the apparent density of the pellets was 0.98. The unreduced catalyst contained 50.5% cobalt by weight.

The dodecene and liquid ammonia were pumped into the reaction chamber 3 for about 1.5 hours at the expiration of which time the internal pressure within the reaction chamber reached about 2000 pounds per square inch. Dodecene and ammonia charged to the reaction vessel were heated to and maintained at a temperature of 550° F. by the application of heat to the preheating zone of the reaction chamber. At the expiration of the 1.5 hours of charging dodecene and ammonia to the reaction chamber, approximately 1050 cc. of dodecene and 425 cc. of liquid ammonia had been pumped into the reaction chamber. The reaction product was then released from the lower portion of the catalyst zone through line 4 and valve 5 at a rate sufficient to maintain a pressure within the reaction chamber of 2000 pounds per square inch with the simultaneous and continuous charging of 40 cc. of liquid ammonia per hour and about 200 cc. of dodecene per hour into the chamber through the pump 1. This charging rate represented a space velocity of about 0.2 through the catalyst bed. The reaction product was passed through the cooler 6 and thence to the receiver 7 wherein the product was stabilized to remove gas therefrom. The final liquid product, at atmospheric pressure, was withdrawn from the receiver.

In order to obtain an analysis of the final liquid product, the liquid product was subjected to fractional distillation with the separation of three fractions. The first fraction was that boiling between 150° F. and 400° F. and will be designated herein at as the low boiling fraction. The intermediate fraction was that portion of the liquid product boiling between 400° F. and 410° F. and comprised essentially the unreacted dodecene. The high boiling fraction, that is the fraction boiling above 410° F., contained the major proportion of the organic nitrogen compounds produced during the amination reaction. Nitrogen content determinations, and hence organic nitrogen compound determinations, were made in accordance with the Kjeldahl method in each instance where such determinations are reported herein. Organic nitrogen compounds contained in the low boiling fraction comprised nitrogenous compounds produced essentially by the cracking of the lauryl amine and appeared, by chemical analysis, to be essentially octyl nitrile. The organic nitrogen compounds contained in the high boiling fraction comprised essentially lauryl amine and lauryl nitrile. Table I summarizes the yield of low boiling and high boiling organic nitrogen compounds, and the total yield of organic nitrogen compounds, recovered in the low boiling and high boiling fractions at reaction temperatures of 450°, 550°, 650°, and 750° F. and at a reaction pressure of about 2000 pounds per square inch, these yields being based on the amount of olefine consumed.

Table I

|  | Reaction temperature, °F | | | |
|---|---|---|---|---|
|  | 450 | 550 | 650 | 750 |
| Low boiling nitrogen compounds, percent weight | 0.0 | 3.0 | 3.5 | 3.0 |
| High boiling nitrogen compounds, percent weight | 12.1 | 12.5 | 9.0 | 6.3 |
| Total organic nitrogen compounds, percent weight | 12.1 | 15.5 | 12.5 | 9.3 |

Calculations based on analyses of the low boiling, intermediate, and high boiling fractions for organic nitrogen compounds in the amination run at 550° F. and 2000 pounds pressure, for example, show that about 10% of the olefine charge was converted to oragnic nitrogen compounds, about 44% of the olefine charge was recovered, and the remainder of the olefine charge was converted to non-aminated products, 9% of this remainder of the olefine charge being cracked, 18% being hydrogenated, and 19% being polymerized. The recovered olefine has been found to be a suitable olefine charging stock for the amination process of my invention and may be recycled in a continuous process with resulting substantial increase in the yield of organic nitrogen compounds based on olefine consumed.

Table I shows the effect of temperature variations on the yield of organic nitrogen compounds at a reaction pressure of about 2000 pounds per square inch. Table II shows the effect of pressure variations on the yield of organic nitrogen compounds at a reaction temperature of about 550° F. Data for Table II was obtained by separate runs at 500, 1000, 2000, and 3000 pounds per square inch reaction pressure while charging liquid ammonia and dodecene-1 through a fixed bed of catalyst. About 3 to 4 mols of ammonia were charged for each mol of the olefine and the olefine was charged at the rate of about 200 cc. per hour. The catalyst comprised pellets of cobalt on a cobalt silicate carrier produced by precipitating cobalt hydroxide on cobalt silicate and by forming the resulting precipitate into ⅛ inch pellets. About 1000 cc. of the pellets were charged to the catalyst zone of the reaction chamber where they were calcined by heating at 660° F. for 8 hours in a nitrogen atmosphere and by then reducing the cobalt oxide with a stream of hydrogen for 115 hours at 660° F. The reduced catalyst contained 46.4% cobalt by weight.

Table II

|  | Pressure, #/sq. in. | | | |
|---|---|---|---|---|
|  | 500 | 1,000 | 2,000 | 3,000 |
| Organic nitrogen compounds, percent of olefine charged | 4.4 | 6.3 | 5.1 | 5.1 |
| Organic nitrogen compounds, percent of olefine consumed | 10.0 | 12.6 | 13.8 | 13.2 |

Although the process of my invention may be carried out by charging ammonia and olefine to a reaction vessel and by maintaining the charge sealed with the catalyst in the vessel for a substantial period of time, I have found that numerous advantages are realized by passing the olefine and ammonia through a bed of catalyst. For example, the yield of organic nitrogen compounds, based on olefine consumed, obtained by passing the olefine and ammonia through a fixed bed of catalyst under optimum reaction conditions is nearly double the yield obtained by maintaining a similar amount of olefine and ammonia in fixed contact with the catalyst under the same conditions and equivalent contact period within a sealed reaction vessel. Furthermore, the continuous flow process of my invention, particularly at optimum reaction temperature and pressure, is characterized by less cracking, polymerization, dehydrogenation, and hydrogenation than amination in a sealed vessel under similar reaction conditions. The process of direct amination of olefines using a fixed bed of a selective catalyst affords a new and less expensive method of producing organic nitrogen compounds such as amines, nitriles and their derivatives and of producing certain amines, nitriles and their derivatives which have not hitherto been produced by commercial methods.

I claim:

1. In the production of amines and nitriles, the improvement which comprises passing a mixture of an olefine and ammonia through a bed of catalyst selectively promoting the amination reaction at a temperature substantially within the range of 450° F. to 750° F. under a pressure of at least substantially 500 pounds per square inch.

2. In the production of amines and nitriles, the improvement which comprises passing a mixture of an olefine and ammonia through a bed of catalyst selectively promoting the amination reaction at a temperature substantially within the range of 500° F. to 600° F. under a pressure of at least substantially 1000 pounds per square inch.

3. In the production of amines and nitriles, the improvement which comprises passing a mixture of an olefine and ammonia through a bed of catalyst selectively promoting the amination reaction at a temperature substantially within the range of 450° F. to 750° F. under a pressure of at least substantially 2000 pounds per square inch.

4. In the production of amines and nitriles, the improvement which comprises passing a mixture of an olefine and ammonia through a bed of catalyst selectively promoting the amination reaction at a temperautre substantially within the range of 450° F. to 750° F. under a pressure substantially within the range of 2000 to 3000 pounds per square inch.

5. In the production of amines and nitriles, the improvement which comprises passing a mixture of an olefine and ammonia through a bed of catalyst selectively promoting the amination reaction at a temperature substantially within the range of 500° F. to 600° F. under a pressure substantially within the range of 2000 to 3000 pounds per square inch.

6. In the production of amines and nitriles, the improvement which comprises passing a mixture of an olefine and ammonia through a bed of catalyst selectively promoting the amination reaction at a temperature of substantially 550° F. under a pressure of at least substantially 2000 pounds per square inch.

7. In the production of amines and nitriles, the improvement which comprises passing a mixture of an olefine and ammonia in amount substantially in excess of that theoretically required to combine with the olefine through a bed of catalyst selectively promoting the amination reaction at a temperature substantially within the range of 450° F. to 750° F. under a pressure of at least surbstantially 500 pounds per square inch.

8. In the production of amines and nitriles, the improvement which comprises passing a mixture of an olefine and ammonia in the proportion of about 1 mol of the olefine to about 1.6 mols of ammonia through a bed of catalyst selectively promoting the amination reaction at a temperature substantially within the range of 450° F. to 750° F. under a pressure of at least substantially 500 pounds per square inch.

9. In the production of amines and nitriles, the improvement which comprises passing a mixture of an olefine and ammonia in the proportion of about 1 mol of the olefine to about 1.6 mols of ammonia through a bed of catalyst selectively promoting the amination reaction at a temperature substantially within the range of 500° F. to 600° F. under a pressure of at least substantially 2000 pounds per square inch.

10. In the production of amines and nitriles, the improvement which comprises passing a mixture of an olefine and ammonia through a bed of a cobalt catalyst selectively promoting the amination reaction at a temperature substantially within the range of 450° F. to 750° F. under a pressure of at least substantially 500 pounds per square inch.

11. In the production of amines and nitriles, the improvement which comprises passing a mixture of an olefine and ammonia through a bed of catalyst comprising metallic cobalt deposited on silica at a temperature substantially within the range of 450° F. to 750° F. under a pressure of at least substantially 500 pounds per square inch.

12 In the production of amines and nitriles, the improvement which comprises passing a mixture of an olefine and ammonia through a bed of catalyst selectively promoting the amination reaction at a temperature substantially within the range of 450° F. to at least substantially 750° F. under a pressure of about 500 pounds per square inch, separating unconverted olefine from the reaction products, and subjecting the separated unconverted olefine to further reaction in contact with ammonia.

JOHN W. TETER.

---

CERTIFICATE OF CORRECTION.

Patent No. 2,381,470.                                                   August 7, 1945.

JOHN W. TETER.

It is hereby certified that error appears in the printed specification of the above numbered patent requiring correction as follows: Page 1, second column, line 7, for "places" read --place--; page 1, second column, line 51, for "foreging" read --foregoing--; page 3, first column, line 48, for "oragnic" read --organic--; page 4, second column, lines 30-31, claim 12, for the words "at least substantially 750° F. under a pressure of about" read --750° F. under a pressure of at least substantially--; and that the said Letters Patent should be read with this correction therein that the same may conform to the record of the case in the Patent Office.

Signed and sealed this 25th day of December, A. D. 1945.

Leslie Frazer (Seal)                                          First Assistant Commissioner of Patents.

range of 450° F. to 750° F. under a pressure substantially within the range of 2000 to 3000 pounds per square inch.

5. In the production of amines and nitriles, the improvement which comprises passing a mixture of an olefine and ammonia through a bed of catalyst selectively promoting the amination reaction at a temperature substantially within the range of 500° F. to 600° F. under a pressure substantially within the range of 2000 to 3000 pounds per square inch.

6. In the production of amines and nitriles, the improvement which comprises passing a mixture of an olefine and ammonia through a bed of catalyst selectively promoting the amination reaction at a temperature of substantially 550° F. under a pressure of at least substantially 2000 pounds per square inch.

7. In the production of amines and nitriles, the improvement which comprises passing a mixture of an olefine and ammonia in amount substantially in excess of that theoretically required to combine with the olefine through a bed of catalyst selectively promoting the amination reaction at a temperature substantially within the range of 450° F. to 750° F. under a pressure of at least surbstantially 500 pounds per square inch.

8. In the production of amines and nitriles, the improvement which comprises passing a mixture of an olefine and ammonia in the proportion of about 1 mol of the olefine to about 1.6 mols of ammonia through a bed of catalyst selectively promoting the amination reaction at a temperature substantially within the range of 450° F. to 750° F. under a pressure of at least substantially 500 pounds per square inch.

9. In the production of amines and nitriles, the improvement which comprises passing a mixture of an olefine and ammonia in the proportion of about 1 mol of the olefine to about 1.6 mols of ammonia through a bed of catalyst selectively promoting the amination reaction at a temperature substantially within the range of 500° F. to 600° F. under a pressure of at least substantially 2000 pounds per square inch.

10. In the production of amines and nitriles, the improvement which comprises passing a mixture of an olefine and ammonia through a bed of a cobalt catalyst selectively promoting the amination reaction at a temperature substantially within the range of 450° F. to 750° F. under a pressure of at least substantially 500 pounds per square inch.

11. In the production of amines and nitriles, the improvement which comprises passing a mixture of an olefine and ammonia through a bed of catalyst comprising metallic cobalt deposited on silica at a temperature substantially within the range of 450° F. to 750° F. under a pressure of at least substantially 500 pounds per square inch.

12 In the production of amines and nitriles, the improvement which comprises passing a mixture of an olefine and ammonia through a bed of catalyst selectively promoting the amination reaction at a temperature substantially within the range of 450° F. to at least substantially 750° F. under a pressure of about 500 pounds per square inch, separating unconverted olefine from the reaction products, and subjecting the separated unconverted olefine to further reaction in contact with ammonia.

JOHN W. TETER.

CERTIFICATE OF CORRECTION.

Patent No. 2,381,470.  August 7, 1945.

JOHN W. TETER.

It is hereby certified that error appears in the printed specification of the above numbered patent requiring correction as follows: Page 1, second column, line 7, for "places" read --place--; page 1, second column, line 51, for "foreging" read --foregoing--; page 3, first column, line 48, for "oragnic" read --organic--; page 4, second column, lines 30-31, claim 12, for the words "at least substantially 750° F. under a pressure of about" read --750° F. under a pressure of at least substantially--; and that the said Letters Patent should be read with this correction therein that the same may conform to the record of the case in the Patent Office.

Signed and sealed this 25th day of December, A. D. 1945.

Leslie Frazer (Seal)      First Assistant Commissioner of Patents.